July 31, 1962

B. DRAKE ET AL 3,047,816

PARALLEL CONNECTED SYNCHRONIZED OSCILLATORS WITH AUTOMATIC DISABLING CONTROLS

Filed July 23, 1959

3 Sheets-Sheet 1

INVENTORS

BERNARD DRAKE
DONALD KEITH HICKS

BY Larson and Taylor

INVENTORS

BERNARD DRAKE
DONALD KEITH HICKS

BY

July 31, 1962 B. DRAKE ETAL 3,047,816

PARALLEL CONNECTED SYNCHRONIZED OSCILLATORS
WITH AUTOMATIC DISABLING CONTROLS

Filed July 23, 1959 3 Sheets-Sheet 3

INVENTORS

BERNARD DRAKE
DONALD KEITH HICKS

BY Lawson and Taylor 3,047,816

PARALLEL CONNECTED SYNCHRONIZED OSCILLATORS WITH AUTOMATIC DISABLING CONTROLS

Bernard Drake, Blackheath, London, and Donald Keith Hicks, Dartford, England, assignors to Siemens Edison Swan Limited, London, England, a British company Filed July 23, 1959, Ser. No. 829,101
Claims priority, application Great Britain Aug. 6, 1958
14 Claims. (Cl. 331—49)

This invention relates to A.C. electric supply arrangements and in particular to such arrangements which are required, ideally, to provide a constant frequency supply with freedom from any significant discontinuity. These requirements are found, for instance, in carrier transmission systems and in voice frequency and other A.C. signalling systems, specific examples being furnished by telegraphy, and telephony, radio broadcasting, navigation, time-keeping, computing and so on.

Constant frequency supplies can be provided by self-maintaining oscillator generators including frequency determining elements of the required precision which may be electrical, as in the case of a tuning circuit, or electromechanical as in the cases of tuning forks, piezo-electric crystals and magnetostrictive cores. Variations in electrical load, particularly where the latter may be partly reactive, may be prevented from affecting the frequency by isolating the generator from its load by means of an intervening electronic amplifier.

With a view to maintaining a supply in the event of failure of a generator, it is known to employ, in respect of any particular frequency, two generators of which one normally supplies the load while the other is a stand-by brought into service to supply the load only in the event of failure of the first. With such an arrangement, however, there is an inherent discontinuity of supply during the change-over from one generator which has failed to the other. In some signalling systems the likelihood of such a discontinuity, though inconvenient, may be tolerable, but with the advent of multi-frequency trunk signalling in telephony there has arisen a real need for improvement in supply continuity. One reason for this is that, because of the number of frequency supplies required, say six, there is consequently likely to be a greater incidence of faults than in a system employing a single frequency. Another and perhaps more important reason is that in some trunk signalling systems the setting up of a trunk call may be adversely affected if a failure occurs during it, because even a short interruption of supply may cause an error in the digital information being signalled.

An arrangement has also been proposed in which two generators feed the load simultaneously through a combining hybrid transformer, the two generators being locked in synchronism and the intention being that on failure of one generator the other continues to supply the load without interruption of the supply. However, for some fault conditions this arrangement as previously proposed has certain disadvantages, especially where the design of the hybrid is such as to provide tight coupling between the generators on the one hand and busbars feeding the load on the other hand. For instance, if one of the generators becomes short-circuited, the resulting substantial drop in busbar voltage could result in the second generator being overloaded to such an extent as to have a seriously distorted output waveform. If, on the other hand, the synchronisation between the generators fails, they will in general have slightly different frequencies which will beat together and result in the busbar voltage passing through zero or some relatively very low value to constitute an effective discontinuity of the supply. In both cases the condition resulting from the fault would persist. Yet again, there would be a useless circulation of power between the generators if they should differ in amplitude or phase, and there may be difficulty in applying known methods of causing the operation of an alarm in such circumstances.

In yet another proposal two generators simultaneously feeding a load are arranged to operate with a phase difference of about 120° between their outputs, so that although no significant change of magnitude of the load voltage will occur on disappearance of the output E.M.F. from one generator, the phase of the load voltage would change by about 60°, which, if the change is sudden, does represent a significant discontinuity particularly in the case of some signalling systems. Furthermore, there is still the possibility of an effective supply discontinuity arising should one generator go out of phase with the other, giving a beat condition which results in the voltage going through zero or some other low value.

It is an object of the present invention to provide a supply arrangement which represents an improvement over the foregoing known arrangements as regards continuity of supply.

According to the invention there is provided an A.C. supply arrangement in which at least two self-sustaining oscillator generators, each having an output connection and a synchronising connection independent of its own output connection, are connectible to an output combining circuit through respective interrupting switches included in the output connections and each automatically controlled to be closed for normal operation (in which both generators feed the combining circuit together) but to be opened to disconnect its generator from the combining circuit in response to reduction in the output voltage of that generator by more than a certain amount, the arrangement also including means operable in response to synchronisation failure between the generators to open the interrupting switch of one of the generators involved, thereby to prevent the combined voltages from going through a low value.

It is contemplated that the interrupting switches will usually be constituted by contacts of respective electromagnetic relays, but the possibility of using electronic switches is not excluded: as regards this latter possibility, an electronic switch is herein considered to be "closed" when passing current and "open" when passing substantially no current.

The output combining circuit, which is preferably designed to afford tight coupling, that is low attenuation, between each generator and the output terminals of the supply arrangement, need not be a hybrid but may simply comprise in series between the generators and a common point from which the output is taken, respective impedance connections which for the sake of reliability may with advantage be constituted by resistances. The impedance connection for each generator would then preferably be arranged to be partially removed from the circuit, as by short-circuiting part of it, in response to disconnection of another of the generators, in order that the impedance looking into the generators from the output point will remain within a particular range of values irrespective of the number of generators in service: change in the output voltage regulation of the arrangement on disconnection of a generator can therefore in this way be kept to a minimum.

Thus in an arrangement having two generators intended normally to share in providing the supply, the connection of these two generators to a common junction point from which their combined output is taken may be effected as regards each generator by way of two serially connected impedances one of which is arranged to be short-circuited should the other generator be disconnected. By way of example, if the impedance of each generator in itself is, say, 2 ohms, each generator may be coupled to the common output point through a 3.3 ohm resistor in series with a 5.1 ohm resistor, of which resistors the latter one may be arranged to be short-circuited if the other generator is disconnected: in this way the combined generator impedance as seen from the output point would be approximately 5¼ ohms irrespective of whether both generators are in service or only one.

In addition to the disconnection facilities provided in the arrangement of the invention for fault conditions which could give rise to a discontinuity or serious waveform distortion in the supply, namely loss or excessive reduction of a generator output voltage or loss of synchronisation, the arrangement may also include alarm facilities for drawing attention to other fault conditions giving rise for instance to unbalance between the generator outputs but not affecting the supply in a manner requiring disconnection of a generator: one such fault would be an open-circuit condition on the output of one of the generators, which condition, by also open-circuiting the corresponding side of the combining circuit, would not seriously impair the supply as then provided solely by the other generator. As against this, it will be appreciated that in the case of a short-circuit or other condition giving rise to loss of voltage at the generator output without imposing an effective open-circuit on the combining circuit there is a resultant reduction of the impedance into which the remaining generator is feeding and this could result in this latter generator being overloaded to an extent such as to cause serious distortion of its waveform as previously mentioned.

The manner in which such additional alarm facilities may be provided will be considered in the following circuit description of a particular supply arrangement embodying the invention. In this description reference will be made to the accompanying drawings in which.

Figure 1:
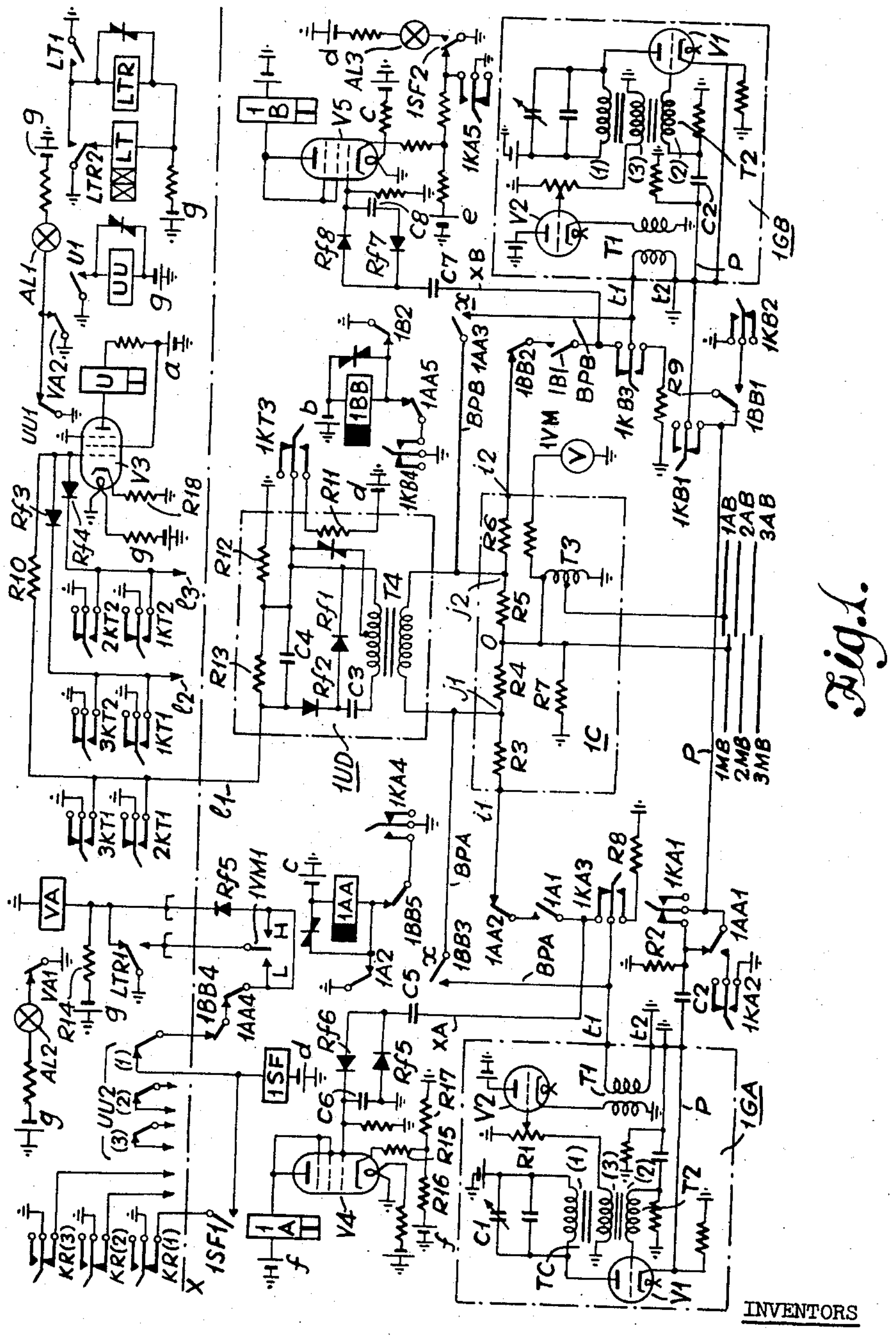
FIG. 1 illustrates with conventional symbols the circuit of a two-generator supply arrangement embodying the invention and relating to one of the several frequencies required for a multi-frequency signalling system, a similar arrangement being assumed to be provided for each of the other frequencies.
Figure 3:
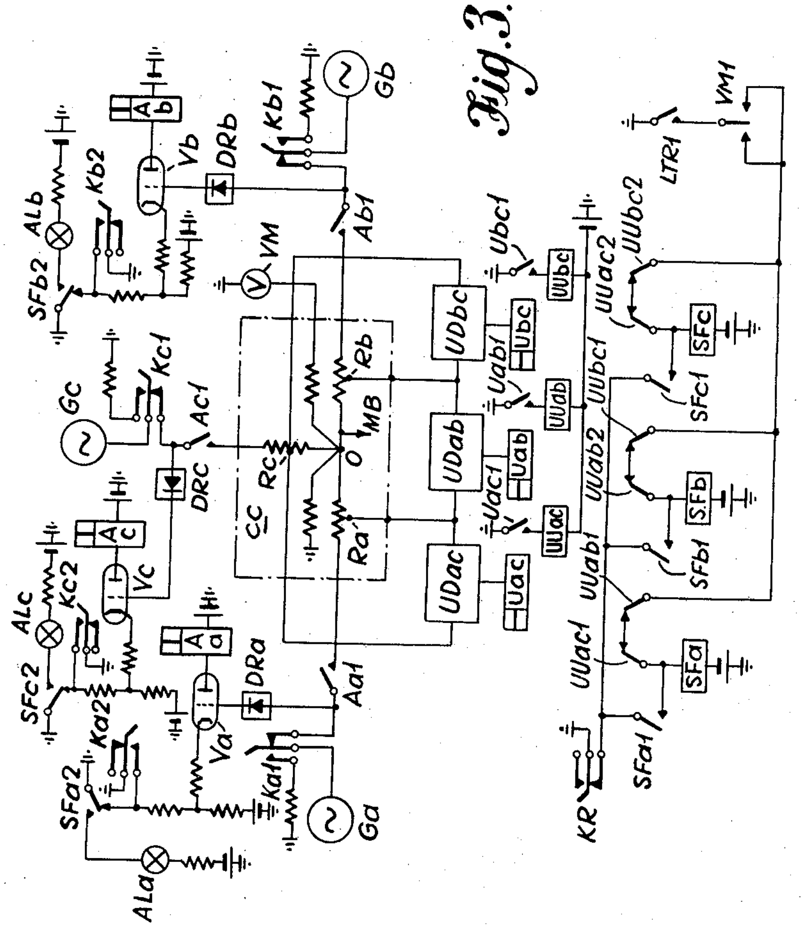
FIG. 3 illustrates in partial block schematic form a supply arrangement involving three generators in respect of a single frequency.

FIG. 1 also illustrates, above the horizontal chain-dotted line X—X therein, common alarm equipment which may be provided for the respective supply arrangements for the several frequencies, while FIG. 3 also illustrates a modification of the alarm equipment applicable where each supply arrangement includes three or more generators.

For the purposes of this description it will be assumed that the circuits are intended for a multifrequency system requiring supplies of three different frequencies *f*1, *f*2, *f*3, although in practice some greater number of frequencies than this may be required: for instance a known system requires frequencies of 700, 900, 1100, 1300, 1500, 1700 cycles per second respectively.

In FIG. 1 there is illustrated below the horizontal chain-dotted line X—X the supply arrangement for, say, the frequency *f*1, as indicated by the numerical prefix 1 appended to the reference characters of the principal circuit elements. Similar supply arrangements are provided for the frequencies *f*2 and *f*3, and in the common alarm equipment illustrated above the chain-dotted line certain elements which relate individually to the several frequencies are identified either by the relevant prefix, in the case of the test keys KT, or by a corresponding bracketted suffix in the case of the individual sections of the common resetting key KR and in the case of the individual UU2 contacts on the common relay UU. For the sake of clarity of the drawing, various battery supplies have been represented by separate conventional battery symbols in FIG. 1. In practice, however, these supplies would usually be taken from a battery-fed distribution board. Accordingly in FIG. 1 the battery symbols have appended to them reference letters *a, b, c, d* . . . which represent different supply points on such distribution board and it will be noted that the same reference letter may appear a number of times, indicating that the several supplies to which it is appended are assumed to be taken from the same supply point.

The supply arrangement for each frequency comprises, as illustrated for frequency *f*1, a pair of synchronised thermionic valve oscillator generators 1GA and 1GB which in normal operation are connected so as jointly to feed a main supply busbar 1MB through a combining circuit 1C providing tight coupling. These generators 1GA and 1GB may take various forms but by way of example have been illustrated as each comprising an oscillator valve V1 followed by a cathode follower output valve V2. To avoid over-burdening the drawing, the cathode heater circuits for these valves V1 and V2 have not been shown. The output valve V2 feeds output terminals *t*1, *t*2 for the generator via a step-down transformer T1 which provides a low output impedance of, say, about 2 ohms. One of the output terminals, *t*2, may be assumed to be earthed. A frequency-determining element, constituted by a tuned circuit TC with an adjustable frequency trimmer C1, is connected in the anode circuit of the oscillator valve V1, while a coupling transformer T2 having its primary (1) in the tuned circuit TC has a secondary winding (2) connected in the grid circuit of the valve V1 to provide positive feedback for sustaining oscillation, and a tertiary winding (3) feeding the grid circuit of the output valve V2 via an adjustable amplitude trimmer R1.

Instead of employing a symmetrical mode of synchronisation, as could be done by introducing inter-cathode coupling between the oscillator valves V1 of the two generators 1GA and 1GB, but which could involve a circulation of power in the synchronising path tending to lead to wide phase deviations for small differences of natural self-oscillating frequency of the generators, it is preferred to couple the cathode of the oscillator valve V1 of one generator (1GA) over a synchronising path P to the grid circuit of the oscillator valve of the other generator (1GB), so that this latter generator is forced into synchronism with the first. The synchronising path P, including series capacitors C2 and shunt resistors R2 to remove the D.C. component of the cathode voltage of the first oscillator valve, also includes various isolating and earthing contacts (1KA1, 1KA2, 1AA1, 1KB1, 1KB2, 1BB1) as will be more fully described later. By adjustment of the frequency and amplitude trimmers C1, R1, the output voltages of both generators 1GA and 1GB can be adjusted in frequency and amplitude if isolated (namely when contacts 1KA1 and 1AA1 or contacts 1KB1 and 1BB1 are in their operated conditions) and in phase and amplitude if synchronised.

For each frequency there is also provided a manually operable three-position isolating key (KA/KB) which has an intermediate normal position, a first off-normal position in which a contact section KA of the key is operated, and a second off-normal position in which a second contact section KB is operated. For the frequency *f*1 (and likewise for the other frequencies) operation of section 1KA of this key disconnects the generator from the combining circuit 1C at break contacts 1KA3, and operation of the other section, 1KB, disconnects the generator 1GB at break contacts 1KB3. In addition to the contacts 1KA1–2–3 and 1KB1–2–3 already mentioned, the KA section of the isolating key has further contacts 1KA4–5 and the KB section has further contacts 1KB4, all of which are connected at various points in the circuit for purposes which will be explained hereinafter.

The output terminals $t1$ of the generators 1GA and 1GB are connected to respective input terminals $i1$ and $i2$ of the combining circuit 1C through respective paths each including the break contact 1KA3 or 1KB3 of the related section 1KA or 1KB of the isolating key, a make contact 1A1 or 1B1 of a normally energised interrupting relay 1A or 1B (constituting an interrupting switch as previously referred to), and a break contact 1AA2 or 1BB2 of a slow release isolating relay 1AA or 1BB which normally has an inverse repeater action with respect to the related interrupting relay 1A or 1B as the case may be: to this end the isolating relay 1AA has, as shown, an energising circuit which is completed on closure of the normally open break contact 1A2 of relay 1A (that is, on release of normally energised relay 1A) and likewise the isolating relay 1BB has an energising circuit which is completed on closure of the normally open break contact 1B2 of relay 1B. The input terminals of the combining circuit 1C are connected through respective pairs of series resistors R3, R4 and R5, R6 to a common output point O which is connected directly to the main busbar 1MB. This point O is also connected to earth through a further relatively large resistor R7 which ensures that a load is always present, and an auto-transformer T3 may also be connected between the output point O and earth for the purpose of feeding an auxiliary busbar 1AB with a supply of the same frequency but lower amplitude. Corresponding busbars 2MB, 2AB, 3MB and 3AB are fed from the similar supply arrangements providing the frequencies $f2$ and $f3$.

Between the output terminal $t1$ of generator 1GA and the junction $j1$ of the two resistors R3, R4 in the pair through which it is connected to the common output point O of the combining circuit 1C, is a by-path BPA which can be established through a make contact 1BB3 of the isolating relay 1BB associated with the other generator 1GB, this isolating relay contact 1BB3 being marked with an $x$ to indicate that it has an early-make, late-break action. A similar by-path BPB is provided in respect of generator 1GB between its output terminal $t1$ and the junction $j2$ of resistors R5, R6, this by-path being able to be established through a make contact 1AA3 of the isolating relay 1AA associated with generator 1GA. Consequently when either generator 1GA or 1GB has been disconnected by operation of its interrupting relay 1A or 1B as the case may be, one of the resistors, R3 or R6, of the pair between the remaining generator and the output point O is short-circuited. The reason for this and possible values of the resistors have already been discussed above. The establishment of the by-path BPA or BPB also ensures that the generator, 1GB or 1GA, which remains in service cannot then be disconnected from the combining circuit 1C by action of the corresponding interrupting relay, 1B or 1A, or of the corresponding section KB or KA of the isolating key, thus ensuring continuity of supply.

On disconnection of either generator, 1GA or 1GB, from the combining circuit 1C by operation of contacts 1KA3 or 1KB3 of the relevant section of the isolating key, these contacts may also effect the connection to the generator concerned of an artificial load constituted by a resistor R8 (1GA) or R9 (1GB) of appropriate value.

For detecting unbalance between generators 1GA and 1GB when both are connected to the combining circuit 1C, the voltage appearing between the junction points $j1$ and $j2$ of the resistor pairs R3, R4 and R5, R6, is applied to an unbalance detecting circuit 1UD, which voltage will be zero if the generators are balanced. More particularly, this voltage is applied through a transformer T4 to a voltage-doubler rectifying unit $c3$, $c4$, R$f1$, R$f2$, by which it is applied across load resistor R13 to produce a negative, rectified, voltage, on a lead $l1$. Unbalance detecting circuits corresponding to 1UD and likewise associated with the generator pairs for the other frequencies $f2$ and $f3$, also apply to leads $l2$ and $l3$, in response to unbalance in their generator pairs, negative rectified voltages which, with that on lead $l1$ from circuit 1UD, are applied through a resistance-rectifier combining network R10, R$f3$, R$f4$ to a control electrode of a valve V3 having a relay U in its anode circuit, this relay U being hereafter termed the unbalance relay. The valve V3 is biased to be normally conductive, so that the unbalance relay U is therefore normally energised. Should the generators such as 1GA, 1GB of any pair become unbalanced, the resultant negative voltage applied to the corresponding lead $l1$, $l2$ or $l3$ will result in the conduction of the valve V3 being reduced to an extent which, for a sufficiently great unbalance, will release the unbalance relay U. This relay U has a repeater relay UU which is normally energised over contact U1 of relay U but which is released on opening of this contact when relay U releases. On release of relay UU a break contact UU1 thereof recloses and establishes an alarm circuit represented as including an alarm lamp AL1.

In order to determine in which of the generator pairs an unbalance condition as indicated by the alarm lamp AL1 exists, a number of test keys IKT, 2KT, 3KT are provided. Each of these keys is associated with a particular generator pair (that is with a particular frequency), and operation of any one of them will remove any rectified unbalance voltage appearing on the leads $l$ associated with the other generator pairs. At the same time any unbalance voltage on the lead $l$ associated with the operated key's own pair of generators is boosted by introducing an additional negative bias for the valve V3. For example, operation of test key 1KT applies earth potential to leads $l2$ and $l3$ at contacts 1KT1 and 1KT2 respectively, while its contact 1KT3 applies a negative potential over resistor R11 to the junction of resistors R12 and R13 in circuit 1UD, thus boosting any negative potential already present on lead $l1$. Operation of the test key KT relating to a balanced generator pair, by thus removing the negative potential applied to the valve V3, will therefore cause restoration of the conduction of this valve and consequent re-operation of the unbalance relay U and its repeater UU, thereby removing the alarm indication on lamp AL1. On the other hand, operation of the test key for an unbalanced pair will fail to re-operate the relays U and UU and will therefore fail to remove the alarm condition. Should no key remove the alarm the fault is in the alarm circuit itself, but if all keys except one remove the alarm then the generator pair to which that key relates is the unbalanced pair. Having determined which generator pair is unbalanced an operator can then proceed to determine where the unbalance has arisen, making use of testing or monitoring facilities which may be provided as will hereafter be described.

Deviation of the output voltage on busbar MB beyond specified upper and lower limits may be detected by means of a contact-operating voltmeter 1VM which, in response to such deviation, brings its moving contact 1VM1 into engagement with one or other of two co-operating limit contacts marked L and H. A busbar voltage alarm relay VA is normally operated by energisation over an obvious circuit through resistor R14, but closure of contact 1VM1 on to its co-operating contact L or H releases the relay VA by establishing a short circuit across its operating winding through rectifier R$f5$, contact L or H, contact 1VM1, and contact LTR1 (operated) of a normally energised supply checking relay LTR which will be considered later. The release of the busbar voltage alarm relay VA results in closure of its contact VA1, and this in turn results in the lighting of an alarm lamp AL2 or in the initiation of some other alarm condition. The relay VA will also be released in a similar manner to give an alarm in the event of a short-circuit or open-circuit condition which, occurring at any point which is fed by the generators in common, reduces the busbar voltage to zero. This alarm AL2 is therefore capable of drawing attention to a fault at such common point while it may still be in an incipient stage.

Neither of the fault conditions for which alarm arrangements have just been described, namely generator unbalance indicated by lamp AL1 and busbar voltage deviation indicated by lamp AL2, is such as in itself would necessarily require the disconnection of one of the generators of a pair in order to avoid a discontinuity or distortion of the supply. For instance generator unbalance could be caused by an open-circuit on one of the generator outputs or by some other fault which produces a difference in the amplitude of the generator E.M.F.'s without leading to interruption of the continuity of the supply. Consequently these alarm arrangements do not in themselves bring about the disconnection of a generator. The arrangements provided in the embodiment being considered for causing generator disconnection under fault conditions requiring this action as previously discussed, in particular short-circuit of a generator or loss of synchronisation, will now be dealt with, considering again, as typical, the supply arrangements including generators 1GA and 1GB for frequency $f1$.

From a point between the contacts of the isolating key contacts 1KA3 and the interrupting relay contact 1A1 in the connection of the generator 1GA to the combining circuit 1C, a connection XA is taken through a voltage-doubler rectifier circuit C5, C6, R$f$5, R$f$6 to a control grid of a valve V4 in the anode circuit of which is connected the operating winding of the interrupting relay 1A for the generator 1GA. In normal operation this valve V4 is normally held conductive by a positive grid voltage which is applied from the circuit C5, C6, R$f$5, R$f$6 to overcome an opposing cathode bias applied through resistor R15 from the junction of a potential dividing resistor chain R16, R17. The interrupting relay 1A is therefore normally energised, but should the output voltage of the generator 1GA drop to an excessively low value, the cathode bias takes control and cuts off the valve V4, thus releasing the interrupting relay 1A. This relay is fast-releasing and on being released opens its contact 1A1 so that the generator 1GA is rapidly disconnected from the combining circuit 1C, provided that the generator 1GB has not already been disconnected accompanied by operation of relay 1BB and the consequent closure of contacts 1BB3 in the by-path BPA.

The interrupting relay 1B for the generator 1GB is similarly controlled in dependence on the output voltage of this generator over connection XB, voltage-doubler rectifier circuit C7, C8, R$f$7, R$f$8, and valve V5, with the exception that in this case the cathode circuit of the valve includes parallel switching paths of which one includes a break contact 1SF2 of a synchronisation-failure relay 1SF (to be considered later) while the other includes a make contact 1KA5 of section 1KA of the isolating key. The function of these contacts 1SF1 and 1KA5 will be described later.

Each of the two interrupting relays 1A and 1B is therefore normally controlled in accordance with the output voltage of the related generator 1GA or 1GB and is rapidly released to disconnect its generator from the output combining circuit 1C should the generator voltage fall excessively due, for instance, to a short-circuit of the generator output or to a failure of the generator output amplifier V2 to receive the output of the oscillator valve V1; either of these circumstances will result in the amplitude of the generator output E.M.F. becoming zero, and since they do so without open-circuiting the combining circuit 1C on the side of the generator concerned, there would be a consequent tendency to overload the other generator as previously explained. The release of the interrupting relay 1A or 1B as the case may be, therefore rapidly throws off this overload. The associated isolating relay, 1AA or 1BB, subsequently opens its contacts 1AA2 or 1BB2 in the generator output connection and also closes at its contacts 1AA3 or 1BB3 the by-path BPB or BPA for the other generator. This by-path, by short-circuiting one of the resistors (R6 or R3) through which this other generator is coupled to the output busbar, reduces the source impedance as seen from the busbar to a value approximating to that which existed when both generators were connected and functioning normally. Since the generators are now effectively unbalanced as regards their effect on the combining circuit, the unbalance alarm relay U and its repeater UU will be released to give an alarm signal on lamp AL1.

Should the short-circuit or other fault condition which caused the loss of generator voltage be removed, the released interrupting relay 1A or 1B will become re-operated and in conjunction with its associated isolating relay 1AA or 1BB will reconnect the disconnected generator, thereby restoring balance so that the alarm signal on lamp AL1 will be removed. Should the fault persist, an attendant, warned by the alarm, can check the outputs of the generators 1GA and 1GB to determine which one is faulty. By operation of the relevant section 1KA or 1KB of the isolating key, the faulty generator can then be finally disconnected at contacts 1KA3 or 1KB3 as the case may be, the action which then takes place being described later.

Turning now to the detection of failure of synchronisation between the generators 1GA and 1GB and the disconnection of one of the generators to prevent the busbar voltage going through a low value representing a supply discontinuity, it will be appreciated, since there are only two generators and one unbalance detecting circuit 1UD, it is not possible to determine by this circuit alone which of the two generators may be causing an unbalance condition. It is therefore arranged that a synchronisation failure, which will not usually be accompanied by a significant drop in the output voltage of either generator and will therefore not cause generator disconnection as a result of such drop, will nevertheless bring about disconnection of one of the generators, arbitrarily chosen, through a synchronisation-failure detecting circuit which operates in response to the combination of unbalance and low busbar voltage conditions which exists in such circumstances.

To this end the synchronisation-failure relay 1SF already mentioned has its operating winding connected in a relay contact chain shown near the top left hand corner of FIG. 1 and including break contacts UU2(1) of the unbalance repeater relay UU, the contacts 1VM1 and L or H of the contact-making voltmeter 1VM and break contacts 1AA4 and 1BB4 of the isolating relays 1AA and 1BB associated with both generators. This relay contact chain has been shown as also including the already mentioned make contact LTR1 of the supply checking relay LTR, which is energised only if the heater supply for the unbalance relay valve V3 has been present for sufficiently long for the valve cathode to have heated up, this same supply (battery connection $g$) being also used for the unbalance relay repeater relay UU, for the busbar voltage alarm relay VA, and for the alarm lamps VA1 and VA2. As shown, the supply checking relay LTR is connected for energisation through a thermally operated make contact LT1 the heating circuit for which, including heater winding LT, is established from the valve heater supply ($g$) through a change-over contact LTR2 of the checking relay LTR: this change-over contact LTR2, on energisation of the checking relay LTR, breaks the heating circuit for the thermal contacts LT1 and establishes an alternative path by which the energisation of relay LTR is maintained when the thermal contacts LT1 subsequently open.

Provided, then, that the supply checking relay LTR has operated after the thermal delay period defined by contacts LT1, and that both generators are connected to the combining circuit so that the isolating relays 1AA and 1BB are therefore in their released condition, lack of synchronism between the generators will result in release of the unbalance relay repeater UU combined with contact closure by the voltmeter 1VM, with resultant energisation of relay 1SF over the relay contact chain already traced. The closure of the voltmeter contacts also operates the busbar voltage alarm relay VA as before, and the busbar voltage alarm lamp AL2 is thereby lit. In operating, the synchronisation-failure relay 1SF locks over a make contact 1SF1 of its own, in series with a break contact KR(1) of a manual resetting key KR, and interrupts at contacts 1SF2 the cathode circuit of the control valve V5 for the interrupting relay 1B, thereby causing that relay to release and disconnect the generator 1GB at contacts 1B1. The generator 1GB having been thus disconnected (followed, on operation of the associated isolating relay 1BB, by closure of the by-path BPA between the generator 1GA and the combining circuit 1C) the busbar voltage restores to normal. The contact 1VM1 of voltmeter 1VM therefore also returns to its normal (mid-) position in which its contacts L and H are un-engaged, with the result that relay VA re-operates and the busbar voltage alarm lamp AL2 goes out. However, the unbalance alarm condition, indicated by the lamp AL1 lit over contacts UU1 of the released relay UU, continues to exist even if the generators come into synchronism again. Therefore in order to differentiate between a synchronisation failure producing this condition and any other fault condition which might do so, the synchronisation-failure relay 1SF is arranged when operated to light a lamp AL3 over its operated contact 1SF2 or to give some other indication that the fault is one of synchronisation failure.

The parameters of the components of the overall circuit are so chosen that for either an earth fault or an open-circuit in the synchronising path P the rate of drift of phase difference is slow enough for the generator 1GB to have been disconnected, through the operation of the synchronisation-failure relay 1SF, well before the busbar voltage can reach its first zero.

Test equipment (not shown) may include an instrument which is or can be connected to measure the anode-cathode current flow in the valve V3 controlling the unbalance relay U, this instrument being, for instance, a voltmeter across the cathode resistor R18 of valve V3. This instrument could be used to assist in correcting unbalance between the two generators of a pair such as 1GA, 1GB, whether or not the unbalance is sufficient to have released the relay U. To this end the relevant test key, such as 1KT for generators 1GA, 1GB, would be operated and the negative boosting bias thereby applied to the grid of valve V3 over resistors R11, R12, R13 would bring the valve to some point on the linear portion of its anode-current/grid voltage characteristic, thereby releasing the relay U if it had not already been released. With the valve V3 then actuating as a sensitive amplifier of any balance voltage appearing across resistor R13, balancing adjustments of the frequencies or output voltages of the two generators can be effected to obtain a peak reading on the instrument measuring the valve current. At this reading the generators will be substantially in balance and release of the test key should result in operation of the relay U.

Other test equipment (not shown) may include a frequency or phase comparator giving an audible or visual indication of the beat frequency or phase difference between two frequencies being compared. On seeing a sychronisation-failure indication on lamp AL3, an attendant could connect such comparator between the output terminals t1 of the two generators 1GA and 1GB and any beating or significant phase difference between them would be heard or seen. An earth fault or open-circuit in the synchronisation path P would generally be indicated by a slow beating and the attendant, without opening the synchronisation path by the isolating key 1KA/KB, could trace it through to find the fault. When the fault is rectified (checked by the phase difference being zero), the re-set key KR can be operated to release the synchronisation-failure relay 1SF by opening its holding circuit at key contact KR(1). This then allows the interrupting relay 1B of the generator 1GB to be operated through valve V5, provided that the output voltage of this generator 1GB is of correct amplitude; this relay 1B, in conjunction with the inverse repeater action of the associated isolating relay 1BB, then automatically reconnects the generator 1GB and opens the by-path at the generator 1GA, whereupon the balance condition will be restored and the unbalance alarm lamp AL1 will go out.

If, on the other hand, a rapid beating, or perhaps a double tone, is produced by the frequency comparator—indicating a considerable change in the natural frequency of one of the generators—a frequency meter may be connected to the busbar 1MB (or 1AB) to check the frequency of the generator 1GA still coupled to it. If the frequency is found to be correct, then the fault is evidently in the disconnected generator 1GB. If, however, the frequency of generator 1GA is found to be incorrect it becomes necessary to disconnect this generator, but only after the generator 1GB has been reconnected to maintain the supply. To this end the section 1KA of the isolating key is operated. At contact 1KA5, this re-makes the cathode circuit for the valve V5 and brings about the re-operation of the interrupting relay 1B to connect the generator 1GB to the combining circuit 1C after the release lag of the isolating relay 1BB. The operation of the isolation key section 1KA also breaks at contacts 1KA3 the main connection between the generator 1GA and the combining circuit 1C, but this latter generator 1GA is kept connected to the combining circuit over the by-path BPA until the releasing isolating relay 1BB eventually opens this by-path to complete the change-over. When the frequency of the faulty generator has been rectified and checked, the reconnection of the generator is effected, in the case of the generator 1GB by operating the reset key KR with the result previously explained, and in the case of the generator 1GA by restoring the isolating key 1KA/KB to normal after the reset key has been operated, which may be at any time after completion of the change-over action by which the generator 1GA was disconnected.

Instead of using a frequency meter to check the frequency on busbar 1MB, as oscilloscope could be connected between this busbar and the corresponding busbar (2MB or 3MB) for another, correct, frequency: assuming that the frequencies are all multiples of a base frequency, say 100 cycles per second, a relatively steady Lissajous figure would then be obtained only if the frequency on the busbar 1MB was also correct.

An oscilloscope or other waveform analysing instrument could also be used for checking the generator outputs for possible faulty waveform in the event of operation of the unbalance alarm lamp AL1 unaccompanied by operation of the synchronisation-failure alarm lamp AL3.

To enable the causes or locations of other faults to be readily determined, the test equipment may also include selecting switches (not shown) by which voltage-responsive instruments and a frequency or phase-difference detector can be selectively connected at different parts of the circuit: for instance a voltmeter could be selectively switched to measure the voltage of any frequency supply at the relevant busbar 1MB, 2MB, 3MB or at the output terminal t1 of either generator coupled thereto, while a detector could be selectively connected between points i1 and j1 or points i2 and j2, to detect the presence of current flowing in one of the coupling resistors (R3 or R6) between either generator and the combining circuit 1C, or between the terminals t1 of the two generators to detect phase difference or beating between the generator output frequencies. The switching may also provide for connecting a meter to monitor the current in any valve.

When generators 1GA and 1GB are both connected to the combining circuit 1C and it is required to disconnect one of them either because it is faulty or for maintenance or for any other reason, this may be done by operating the relevant section 1KA or 1KB of the isolating key. With both generators connected, the interrupting relays 1A and 1B are in their operated condition, the slow acting isolating relays 1AA and 1BB are released, the by-paths BPA and BPB in the generator output connections are open, and by-paths across key contacts 1KA1 and 1KB1 in the synchronisation path P are closed through the changeover contacts 1AA1 and 1BB1 of the isolating relays 1AA and 1BB respectively. The operating winding of each of these isolating relays, in addition to its already described energising circuit including a break contact 1A2 or 1B2 of the associated interrupting relay 1A or 1B, has a secondary energising circuit which includes, in series, a make contact 1KA4 or 1KB4 of the isolating key section 1KA or 1KB for the relevant generator 1GA or 1GB, and a break contact 1BB5 or 1AA5 of the isolating relay 1BB or 1AA associated with the other generator.

On actuating the isolating key 1KA/KB to operate one or other section thereof, say section 1KA, the output of the generator (1GA) to which that section relates is disconnected from the combining circuit 1C at contacts 1KA3 (resulting in operation of the unbalance alarm) and is instead connected, at these same contacts, to the artificial load R8: synchronisation is maintained between the generators 1GA and 1GB since the synchronisation path P is still maintained over the by-path existing through contacts 1AA1 across the operated isolating key contacts 1KA1. Since the interrupting relay contacts 1A1 and 1B1 and the isolating relay contacts 1AA2 and 1BB2 are closed at this time, the interrupting relay 1A for the disconnected generator 1GA is kept operated by reason of the fact that the output from the generator 1GB is applied over these contacts, by way of the resistors R3—R6 in the combining circuit 1C, to the connection XA. However, the disconnecting operation of the isolating key section 1KA establishes the aforementioned secondary energising circuit for the isolating relay 1AA, which, on operating at the end of its operating lag, first establishes, at its early-make contact 1AA3, the by-path BPB for the output connection of the generator 1GB, and then subsequently opens its contacts 1AA2 to bring about the release of the interrupting relay 1A. The changeover contact 1AA1 of the operated isolating relay 1AA breaks the synchronising path P between the generators and applies an earth from operated key contact 1KA2 to the grid circuit of the oscillator valve V1 in generator 1GB: this ensures that the synchronising path P is broken without notable change in the frequency of this latter generator. The operated isolating relay 1AA also interrupts at its contacts 1AA4 the energising circuit for the synchronisation-failure relay SF, which cannot now be operated by closure of the contacts of the contact-making voltmeter 1VM.

The actions which take place on disconnection of generator 1GB by actuation of the other section 1KB, of the isolating key is similar, mutatis mutandis, to those just described for the disconnection of generator 1GB, with the exception that the isolating relay 1BB, on operating to break the synchronising path P, applies earth from the operated key section contacts 1KB2 to the grid circuit of the oscillator valve V1 in generator 1GB, rather than generator 1GA.

Restoration of the isolating key 1KA/KB to normal after it has been used to disconnect a generator as just described, produces the following actions to reconnect the generator which was disconnected. The actions concerning reconnection of generator 1GA will be considered specifically, but are typical for reconnection of either generator. On restoration of the isolating key 1KA/KB to normal (from its position in which section 1KA was operated), the key contacts 1KA1 re-establish the synchronising path P between the generators and the earth condition on this path is at the same time removed by contacts 1KA2. At the isolating key contacts 1KA3 in the main output connection of the disconnected generator 1GA, the artificial load R8 is disconnected and the generator output voltage applied over connection XA to the control valve V4 for its interrupting relay 1A. Assuming correct generator voltage, this relay is thereby operated and breaks at contacts 1A2 the energising circuit of its associated isolating relay 1AA. The interrupting relay contact 1A1 in the main output connection of the generator 1GA is closed, but the connection is not completed until the end of the release time of the isolating relay 1AA, during which time the generators synchronise with each other so that there is no appreciable change in the busbar voltage when the generator 1GA is finally reconnected on completion of the connection by the release of the isolating relay 1AA and closure of its contact 1AA2. The late-break contact 1AA3 of this isolating relay almost immediately afterwards breaks the by-path BPB of the generator 1GB, thereby restoring the generator circuit conditions to normal. The unbalance alarm indication should then cease.

If one generator has been disconnected by operation of the relevant section of the isolating key 1KA/KB and it is desired to reconnect that generator and disconnect the other, the key is simply moved into its position in which its other section is operated. The sequence of actions that take place is then generally similar to that for reconnecting a disconnected generator followed by that for disconnecting a generator, both as described above. If, however, the key 1KA/KB is thrown rapidly to its new position, that is without being left in its normal mid-position for a long enough time to establish the normal condition corresponding to both generators being connected, it is necessary to ensure that at no time is the busbar MB left without a supply and that the synchronising path P is maintained during the change-over period to ensure no discontinuity. This is achieved with the circuit as described because the late-break action of the generator by-path contacts (1AA3 or 1BB3) of the isolating relay (1AA or 1BB) associated with the initially disconnected generator (1GA or 1GB) ensures that the by-path (BPB or BPA) of the initially connected generator (1GB or 1GA) is not broken and that this generator therefore remains connected until the connection of the other generator has been completed. Also, the synchronising path P, initially broken at the contact (1KA1 or 1KB1) of the isolating key section (1KA or 1KB) for the initially disconnected generator (1GA or 1GB) and also at the by-passing change-over contact (1AA1 or 1BB1) of the operated isolating relay (1AA or 1BB) associated with that generator, is immediately re-established by the re-closure of that isolating key contact (1KA1 or 1KB1) and remains completed through the change-over contact (1BB1 or 1AA1) of the other isolating relay (1BB or 1AA) until this latter relay operates. The interrupting relay (1B or 1A) for the initially connected generator remains operated until the associated isolating relay (1BB or 1AA) is operated, since until then the valve (V5 or V4) controlling this interrupting relay is held conducting by the (rectified) generator output received through the isolating relay's contacts (1BB2 or 1AA2) firstly from the initially connected generator over its by-path and then from the other generator after changeover. This isolating relay (1BB or 1AA) is therefore under control of its secondary energising circuit in these circumstances and is not operated until the other isolating relay (1AA or 1BB) on releasing to connect the other generator, closes its contacts (1AA5 or 1BB5) in that circuit. The synchronising path P is therefore maintained, after change-over, for the duration of the operating lag of the isolating relay associated with the interrupting relay of the disconnected generator.

Figure 2:
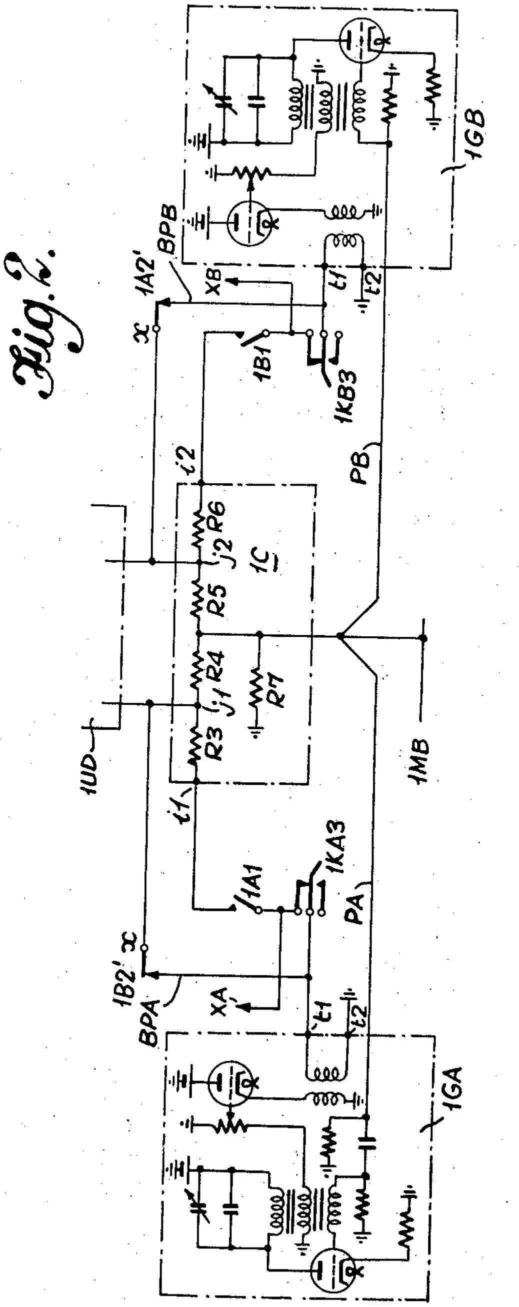
FIG. 2 illustrates a possible modification of part of FIG. 1.

It is contemplated that the isolating and earthing contacts 1AA1, 1KA1, 1KA2, 1BB1, 1KB1, 1KB2, in the synchronising path P may possibly be omitted so that the synchronising path is permanently in an effective condition (if not faulty). In this latter case, as illustrated in FIG. 2, the grid circuits of the oscillator valve V1 of the two generators 1GA and 1GB may be coupled over synchronising connections PA and PB to the busbar 1MB which the generators feed through the combining circuit 1C, so that on disconnection of one generator from the combining circuit that generator would still receive a synchronising signal from the generator remaining in service. It is further contemplated that, with the contacts in the synchronising path omitted, the slow release isolating relays 1AA and 1BB of FIG. 1 may possibly also be omitted. In this case, which FIG. 2 also illustrates, the early-make late-break (*x*) contact in the by-path BPA or BPB, between the output terminal *t*1 of each generator the relevant resistor junction *j*1 or *j*2 in the combining circuit 1C, would be a break contact included on the interrupting relay 1B or 1A for the other generator: these *x* break contacts have accordingly been marked 1A2′ and 1B2′ in FIG. 2.

If each frequency supply (*f*1, *f*2, *f*3) was provided by three or more generators all normally coupled to a common output point, the detection of synchronisation failure could be achieved by modified arrangement in which the generators are taken in pairs (each generator being paired with each of at least two other generators) and each generator pair is provided with an unbalance detecting circuit similar to that already described. It can then be arranged that in the event of a synchronisation failure, the generator which is out of synchronism with the others, as determined by which of the unbalance relays are released, is disconnected by release of its interrupting relay independently of the output voltage of the generator. With this arrangement a synchronisation failure, or any other fault causing unbalance would cause release of the unbalance relays associated with those (two or more) generator pairs which include the faulty generator, the remaining unbalance relays remaining operated: consequently, for disconnection on synchronisation failure, the interrupting relay for each generator could be arranged to be released in response to contact closure of the contact-operating voltmeter in conjunction with release of the particular combination of unbalance relays which indicates that generator to be the faulty one.

This arrangement, which avoids the arbitrary disconnection of one of the generators, is illustrated by FIG. 3, partially in block schematic form, for three generators G*a*, G*b*, G*c*, which feed, through respective resistors R*a*, R*b*, R*c*, in a combining circuit CC, a common point O connected to busbar MB. An unbalance detecting circuit UD*ab*, UD*ac* or UD*bc* is provided in respect of each pair of generators: that is, detecting circuit UD*ab* is provided in respect of generators G*a* and G*b*, UD*ac* in respect of generators G*a* and G*c*, and UD*bc* in respect of generators G*b* and G*c*. These detecting circuits assumed to be identical to the detecting circuit 1UD in FIG. 1, control respective unbalance relays U*ab*, U*ac*, U*bc*, each of which is normally operated but is released (similarly to relay U in FIG. 1) on detection of unbalance between the generators of the pair to which it relates. Relays U*ab*, U*ac*, U*bc*, have respective repeater relays UU*ab*, UU*ac*, UU*bc*.

Connection of the generators G*a*, G*b*, G*c* to the combining circuit CC is manually controllable by respective keys K*a*, K*b*, K*c* (corresponding to key sections 1KA, 1KB in FIG. 1), and is automatically controlled by interrupting relays A*a*, A*b*, A*c* which are themselves controlled according to the generator voltages, through respective voltage doubling rectifying circuits DR*a*, DR*b*, DR*c* and valves V*a*, V*b*, V*c*, the cathode circuits of which include contacts SF*a*2, SF*b*2, SF*c*2 of synchronisation-failure relays SF*a*, SF*b*, SF*c*. The control of each interrupting relay A is therefore similar to that of relay 1B in FIG. 1.

On failure of synchronisation due to a fault in one of the generators, an unbalance condition will arise between that generator and each of the other two, but these other two generators will remain balanced in relation to each other. Consequently two of the three unbalance relays U*ab*, U*ac*, U*bc* will release and the third will remain operated. The contact making voltmeter VM will also close its contacts at VM1 as before. If the fault is in generator G*a*, unbalance relays U*ab*, U*ac* and their repeaters UU*ab*, UU*ac* will release and an operating circuit for synchronisation-failure relay SF*a* will be established over the repeater relay contacts UU*ab*1 and UU*ac*1, the contact VM, and the contact LTR1 corresponding to the similarly referenced contact in FIG. 1. Relay SF*a*, operating and locking over its contact SF*a*1 in series with the reset key KR, thereby breaks the cathode circuit of valve V*a* at contacts SF*a*2, so that interrupting relay A*a* is released and the faulty generator, G*a*, is disconnected at contacts A*a*1. A similar action takes place in respect of a fault occurring in generator G*b* or G*c* and leading to a synchronisation failure. In the case of generator G*b*, the fault results in release of relays U*ab* and U*bc*, and UU*ab* and UU*bc*, with the result that relay SF*b* is operated over contacts UU*ab*2 and UU*bc*1. Likewise in the case of generator G*c*, the relay SF*c* is operated over contacts UU*ac*2 and UU*bc*2 of released relays UU*ac* and UU*bc*. The faulty generator is therefore disconnected automatically and an indication is given on a corresponding synchronisation-failure alarm lamp AL*a*, AL*b* or AL*c* as the case may be.

What we claim is:

1. An A.C. supply arrangement for providing a nominally constant frequency supply with freedom from significant discontinuity, comprising at least two self-sustaining oscillator generators having respective output connections and a synchronising connection for said generators which is separate from their output connections, an output combining circuit to which said generators are connected by their output connections, respective interrupting switches included in said output connections, said switches being closed for normal operation, means associated with each generator for opening the interrupter switch in its output connection and thereby disconnecting it from the combining circuit in response to reduction in the output voltage of that generator by more than a certain amount, and means responsive to synchronisation failure between the generators for opening the interrupting switch in the output connection of one of the generators involved, thereby to prevent the voltage of the combined outputs from going through a low value due to such synchronisation failure.

2. A supply arrangement as claimed in claim 1 comprising only two generators, wherein the means responsive to synchronisation failure between the generators is effective on so responding to open the interrupting switch of a particular one of the generators irrespective of which generator may be causing the failure.

3. A supply arrangement as claimed in claim 2 wherein the synchronisation failure means is responsive to coexisting conditions of output unbalance between the two generators and reduction by more than a certain amount of the voltage of the combined generator outputs.

4. A supply arrangement as claimed in claim 1 comprising more than two generators each paired with each of at least two others, wherein the means responsive to synchronisation failure comprises, in respect to each generator, means for opening the interrupting switch in the output connection of the generator in response to co-existing conditions of on the one hand output unbalance between that generator and those with which it is paired and on the other hand reduction by more than a certain amount of the voltage of the combined generator outputs.

5. A supply arrangement as claimed in claim 1 wherein the output combining circuit comprises a plurality of impedance connections through which the output connections of the generators are respectively coupled to a common output point at which the combined generator outputs will appear.

6. A supply arrangement as claimed in claim 5 including, in respect of each generator, means for rendering part of its impedance connection in the combining circuit ineffective, said means being operable on disconnection of another generator.

7. A supply arrangement as claimed in claim 1 including, in respect of each generator, means for establishing a by-path connection across the interrupting switch in its output connection in consequence of a generator disconnection which leaves only that generator connected to the combining circuit.

8. A supply arrangement as claimed in claim 1 comprising only two generators having a synchronising path connected between them independently of their output connections, together with means for interrupting said path subsequently to disconnection of either generator.

9. An A.C. supply arrangement for providing a nominally constant frequency supply with freedom from significant discontinuity, comprising two self-sustaining oscillator generators, respective interrupting relays for said generators, each normally operable in response to correct output voltage of its generator but releasable in response to this voltage falling by more than a certain amount, respective manual isolating switches for said generators, an output combining circuit, respective output connections for said generators connecting its generator to said output combining circuit and each of which includes an interrupting make contact of the interrupting relay of the relevant generator connected in series with an isolating break contact of the manual isolating switch for that generator, said output of each generator having a by-path connection which is established across the isolating and interrupting contacts in said output connection in consequence of release of the interrupting relay of the other generator, a synchronising connection for said generators which is separate from their connections, and means for releasing the interrupting relay of one of the generators in response to synchronisation failure between the generators.

10. A supply arrangement as claimed in claim 9 wherein the output combining circuit has a common output point and includes respective impedance connections through which said output connections of the two generators are connected to said point, said by-path connection for each output connection extending across the isolating and interrupting contacts therein and a part of the appertaining impedance connection in the combing circuit.

11. A supply arrangement as claimed in claim 9 wherein the synchronising connection for each generator comprises a permanent connection between that generator and a common output point in the output combining circuit, and wherein the by-path connection for the output connection of each generator includes an early-make late-break break contact of the interrupting relay of the other generator.

12. A supply arrangement as claimed in claim 9 wherein the synchronising connection is constituted by a common synchronising path extending between the two generators, and the output connection of each generator includes also a break contact of a slow-acting inverse repeater relay for the interrupting relay of that generator, said repeater relay having an early-make, late-break make contact included in the by-path connection of the other generator for effecting establishment of that by-path and having also a break contact connected in the synchronising path in parallel with a break contact of the manual isolating switch.

13. A supply arrangement as claimed in claim 1 including a voltage-responsive contact operating device arranged to close its contacts on reduction by more than a certain amount of the voltage of the combined generator outputs, an unbalance relay, an unbalance detecting circuit responsive to unbalance between the generator outputs to release said unbalance relay, and a synchronisation-failure relay having an energising circuit including a break contact of the unbalance relay and the contacts of the voltage-responsive contact operating device, said synchronisation-failure relay being thereby operable in consequence of output unbalance coupled with reduction of combined output voltage and being effective on operating to interrupt the energising circuit for one of the interrupting relays.

14. A supply arrangement as claimed in claim 13 provided individually in respect of each of several frequencies and having a common unbalance relay releasable in response to generator output unbalance in any of the several supply arrangements, together with alarm means operable on release of the unbalance relay.

References Cited in the file of this patent

UNITED STATES PATENTS 2,883,561 Reeder et al. ----------- Apr. 21, 1959